(12) United States Patent
Gallati

(10) Patent No.: US 10,464,773 B2
(45) Date of Patent: Nov. 5, 2019

(54) DEVICE AND METHOD FOR PRODUCING PACKAGES FROM FLEXIBLE, FLAT OBJECTS

(71) Applicant: Rudolf Gallati, Neuhas (CH)

(72) Inventor: Rudolf Gallati, Neuhas (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 15/042,891

(22) Filed: Feb. 12, 2016

(65) Prior Publication Data

US 2016/0236897 A1 Aug. 18, 2016

(30) Foreign Application Priority Data

Feb. 13, 2015 (CH) .......................... 197/15

(51) Int. Cl.
| | |
|---|---|
| *B65H 43/04* | (2006.01) |
| *B65H 31/24* | (2006.01) |
| *B65H 39/065* | (2006.01) |
| *B42C 1/10* | (2006.01) |
| *G06Q 10/06* | (2012.01) |

(Continued)

(52) U.S. Cl.
CPC ................ *B65H 43/04* (2013.01); *B42C 1/10* (2013.01); *B65H 29/003* (2013.01); *B65H 31/24* (2013.01); *B65H 37/04* (2013.01); *B65H 39/065* (2013.01); *B65H 39/10* (2013.01); *B65H 39/115* (2013.01); *G06Q 10/06* (2013.01); *G06Q 50/04* (2013.01); *B65H 2220/01* (2013.01); *B65H 2220/09* (2013.01); *B65H 2301/437* (2013.01); *B65H 2301/438* (2013.01); *B65H 2301/4311* (2013.01); *B65H 2301/4473* (2013.01); *B65H 2301/44712* (2013.01); *B65H 2301/5111* (2013.01)

(58) Field of Classification Search
CPC ...... B65H 2301/4311; B65H 2301/511; B65H 39/065; B65H 43/04; B65H 2301/437; B42C 1/10
See application file for complete search history.

(56) References Cited

U.S. PATENT DOCUMENTS

| 3,819,173 A | 6/1974 | Anderson et al. | |
|---|---|---|---|
| 5,098,076 A * | 3/1992 | Kelsey | B65H 39/02 198/347.1 |

(Continued)

FOREIGN PATENT DOCUMENTS

| CH | 570 326 A5 | 12/1975 |
|---|---|---|
| EP | 0 511 159 A1 | 10/1992 |

(Continued)

*Primary Examiner* — Jennifer E Simmons
(74) *Attorney, Agent, or Firm* — Pauley Erickson & Kottis

(57) ABSTRACT

A method for operating a postpress processing installation (1) for producing and processing product units, in particular completed final printed products (D) such as periodicals and newspapers, which are preferably compiled from a jacket product (A) and a plurality of part products and/or inserts (a, b, c, d), and a corresponding postpress processing installation (1). The final printed products (D) are produced according to a predetermined production plan in a manner adapted to the route along which they travel and are processed by means of at least one stacking device (70, 70.1) to form a sequence of standard packages (N) and part packages.

11 Claims, 3 Drawing Sheets

(51) Int. Cl.
    *B65H 29/00*     (2006.01)
    *B65H 39/115*     (2006.01)
    *B65H 37/04*     (2006.01)
    *B65H 39/10*     (2006.01)
    *G06Q 50/04*     (2012.01)

(56) References Cited

U.S. PATENT DOCUMENTS

| | | |
|---|---|---|
| 5,171,005 A | 12/1992 | Manley et al. |
| 5,189,863 A | 3/1993 | Pozzi |
| 5,326,209 A * | 7/1994 | Duke .................. B65H 29/62 198/347.1 |
| 2010/0262279 A1 * | 10/2010 | Jost ........................ B07C 3/08 700/220 |
| 2011/0248438 A1 * | 10/2011 | Stauber ................ B65H 5/085 270/58.23 |
| 2011/0303107 A1 * | 12/2011 | Heiniger ............... B65H 39/02 101/35 |

FOREIGN PATENT DOCUMENTS

| | | |
|---|---|---|
| EP | 1 302 418 A1 | 4/2003 |
| EP | 1 524 126 A1 | 4/2005 |
| WO | WO 2013/159238 A1 | 10/2013 |

\* cited by examiner

DEVICE AND METHOD FOR PRODUCING PACKAGES FROM FLEXIBLE, FLAT OBJECTS

CROSS-REFERENCE TO RELATED APPLICATION

Swiss Patent Application 00197/15, filed 13 Feb. 2015, the priority document corresponding to this invention, to which a foreign priority benefit is claimed under Title 35, United States Code, Section 119, and its entire teachings are incorporated, by reference, into this specification.

BACKGROUND OF THE INVENTION

Field of the Invention

The invention relates to a method for operating a postpress processing installation for producing and processing of printed products, in particular for forming stacks or packages from collections of printed products consisting of completed final printed products such as periodicals and newspapers, which are preferably compiled from a jacket product and a plurality of part products and/or inserts. The present invention relates in addition to a postpress processing installation for the implementation of the method.

Ever greater demands are being placed on postpress processing with increasing regionalization and/or personalization of the editorial content of the products, but in particular of the advertising inserts. On the one hand, there is a need to increase the processing capacity in order to increase profitability, and on the other hand the products must also be capable of being made ready for despatch faultlessly with the smallest possible manual effort, even for small distribution routes or regions.

In the highly competitive advertising market, increasingly high expectations are imposed on the providers of print advertising and thus on postpress processing, and fewer and fewer defects are tolerated. Since advertising clients are only prepared to accept very low defect rates in the low promille range, any defects in the compilation of the products must be avoided or must undergo time-consuming and expensive rectification by hand.

Discussion of Related Art

Different methods are familiar from the prior art for ensuring that the products are compiled in the correct succession or sequence in order to keep the manual repair costs as low as possible.

A method and a device for creating a product stream from a plurality of product units in a predetermined sequence are thus proposed in WO 2013/159238, for example, by means of which defective product units in a sequence can be rectified without any interruption of production and while respecting the predetermined sequence. In this method for creating a synchronized product stream of product units, products are fed to the grouping section of a first conveyor device in a predetermined sequence in a first step, and a synchronized product stream of product units is then produced from the fed products along the grouping section in a predetermined sequence, and the product units are transferred in the predetermined sequence to a transfer conveyor device and are transported away in a synchronized product stream.

In the event of defects arising in the course of producing the products, these can be rectified subsequently by the ejection of individual products or the entire defective product unit at an ejection station, and by producing the product unit in an enhanced or completely new form. It is proposed in particular, however, that, in the event of the failure of only individual products in the product unit, the imperfect product units are fed back to the grouping section and are completed.

The faulty or defective product unit is also subsequently prepared correctly in the grouping section and is then transferred to the transfer conveyor device. In order to introduce this product unit subsequently for the reinstatement of the predetermined product sequence at the correct position within this sequence, a bridging device is proposed in WO 2013/159238, which makes it possible, by bridging a section of the conveyor path of the transfer conveyor device, to feed it subsequently to the product gap. In this way, the predetermined sequence of product units is made available in the transfer conveyor device in a fully sorted sequence for further process operations. The product units are preferably individualized and, for example, are assigned to a specific recipient or a specific recipient's address.

EP 0511159 describes a method and a device, which serve for the compilation of predetermined sequences of complex product units by the insertion of part products into a main product, the intention being to prevent the occurrence of defective groups. In the process, different products supplied as continuous streams along at least one grouping section, provided by a belt conveyor, are collated into groups. Each group is intended to include a predetermined sequence of products. In order to avoid defects in the deposited product stream because of defects in the feeding, it is proposed to continue to buffer the products in the feed streams ahead of their discharge into the grouping section, e.g. by means of corresponding intermediate conveyors. Discharging should only take place if an adequate number of products to create a complete group is present in all the buffers. If necessary, the creation of a group is delayed until this is the case. This takes place substantially in three process steps: feed control of the individual feeds, feed buffering of the individual feeds and controlled discharge of the individual products into a synchronized grouping. The feed control is used to detect defects, or gaps, in the product feeds. The controlled discharge, which is subject to the same rate as the grouping, is used to discharge the supplied products according to the predetermined composition of the individual groups and according to the detected defects in the grouping. A continuous feed is made possible by the feed buffering, in spite of the non-continuous discharge.

The aforementioned devices for the rectification of defects in the production of final printed products and for ensuring the correct product sequence make the installations for postpress processing more expensive and make them considerably more complex in respect of the mechanics, but also the control.

Accordingly, it is often dispensed with, and personalized final printed products that have been rectified or produced in additional quantities subsequently require to be introduced manually into the correct position within their route sequence. In postpress processing installations, which possess an automatic repair function, for example incompletely combined collections can be completed in a further pass. However, this means that at least the stacking device must wait for the rectified end products for the duration of the repair cycle, or, in the case of complete post-production, for the end products that have been produced in additional quantities. This waiting time significantly reduces the output of the installation.

SUMMARY OF THE INVENTION

One object of the present invention is to make available a method and a device for producing a packaged product stream from a plurality of product units in a predetermined sequence, in which, with the simplest possible construction and low equipment costs, correctly packaged product units can be produced in a manner adapted to the route along which they travel in a predetermined sequence. As a result, the rectification of defects in the creation of the product units is facilitated without the need for a significant reduction in the overall output or the processing speed of the postpress processing installation.

According to the present invention, these aims are accomplished by the elements of the independent claims. Further advantageous embodiments can be appreciated in addition from the dependent claims and the description.

The above-mentioned aims are accomplished in particular by the present invention in that the product units, preferably final printed products, are produced according to a predetermined production plan in a manner adapted to the route along which they travel, but are not yet personalized. A (reference) production sequence is laid down in the production plan, which includes the product types and the number of all the product units to be processed for all the routes. For a single route, a predetermined number of identical product units of a type that is specific to the route is produced in each case. Thus, if a number x of identical final printed products or product units (depending on the type of route), although compiled from main products, part products and inserts specifically for the route, is required for a particular distribution route, all that is necessary in a first step is to ensure that an adequate number x of complete product units of this type is produced for this route. The sequence of the individual product units inside the route is not yet relevant, since the product units have not yet been personalized.

In the event of defects arising in the production of the product units, the defectively compiled product units are detected and rectified or rejected in a familiar manner. If defective product units are rejected, a corresponding number of further product units of the same type must be produced, in order to make available the required number of product units or final printed products for the route.

If, in the course of the production of the product units, the defects occur towards the end of a route in the production sequence, this can result in the actual product sequence (actual) deviating from the planned production sequence (reference). It may also be the case that single or multiple product units of the type for a previously produced route lie between product units of another type, as required for a subsequently produced route.

Thanks to the present invention, such deviations in the actual sequence of the products after their production (i.e. the product sequence) from the planned sequence (i.e. the production sequence) do not lead to defective product sequences or orders in the finished packages which are produced for distribution to the end customers.

Personalization, for example in the form of addressing by a printed address label, according to the present invention does not take place already before or in the course of the production of the product units, but immediately before creating the stack in or in conjunction with discharging onto the stacking device. This ensures that only correctly compiled product units or final printed products are addressed at the moment of personalization. The addressing determines the accurate course of the route, or the accurate succession, since the address determines the position inside the route or sequence.

In the method according to the invention for operating a postpress processing installation for producing and processing product units, in particular completed final printed products such as periodicals and newspapers, which are preferably compiled from a jacket product and a plurality of part products and/or inserts, the product units are produced according to a predetermined production plan in a manner adapted to the route along which they travel, that is to say in the desired number for the route and of the desired type for the route. The product sequence is processed by means of at least one stacking device in order to form a sequence of packages, the product units being personalized, and preferably being addressed, only before or only inside the at least one stacking device, and all the product units from the product sequence that have not been processed in the at least one stacking device, which belong to the same route, are personalized and are made available for packaging by means of a discharge station, which is available for personalization and preferably for addressing.

As already mentioned, in the event of defects arising in the course of production of the product units or final printed products, the defective products are eliminated and are produced in additional quantities, or are rectified. Both approaches can result in the printed products that are produced in additional quantities or the rectified final printed products no longer lying within their route in the product sequence. This can be accepted according to the present invention, so that waiting times can be avoided in such a way that a start can already be made on the production of the final printed products for a subsequent route, including if individual or multiple defective products for the previous route still require to be rectified or produced in additional quantities.

All supplied product units or final printed products are addressed and stacked in the right sequence for a route in the stacking device. The last units of a route from the delivered product stream, which no longer produce a standard package, are generally processed into a part package in the stacking device. Part packages accordingly always include a smaller number of product units than standard packages.

As an alternative, they can also be gathered together into a package automatically or manually in a discharge station. In this embodiment, the last product units of a route, which together no longer produce a standard pack, i.e. no package having the maximum number of product units in the package, are discharged via the discharge station and are also addressed in this station. These product units, which form the end of the route, are discharged in the discharge station and are gathered together into a package automatically or manually and are automated as a part package or are added preferably manually to the other packages on the route as the last package of the package sequence to be produced. In this way, the stacking devices are relieved completely of the production of part packages and are able to operate with maximum processing capacity.

The one or more products for the route that have been rectified or produced in additional quantities, which can no longer be delivered in the product sequence within their route, but only with a delay from production, are not processed in the stacking device, but are transported to the discharge station, where they are addressed (for example, by printing the recipient's address or by applying an adhesive recipient label) and are gathered together into an end package. This can be automated or can take place manually. This end package is then added to the other packages on the route as the last package of the package sequence. The need for the stacking device to wait for these products is avoided in this way, and a start can be made on the production of packages for the next route immediately after production of the last package of a route.

In order to be able to operate the installation for postpress processing at the highest possible speed, waiting times of the stacking devices can also be avoided on the one hand and the number of part packages to be produced can be reduced on the other hand.

The present invention permits the production of packages with correct product sequences, which are produced in a manner adapted to the route along which they travel, whereby, including in the event of defect rectification or post-production of products on the route, only a single end package must be added manually to the other packages on the route. Manual handling is restricted to a minimum, preferably to feeding of the end package to the other packages on the route.

According to a further embodiment, it is also possible through the present invention to operate the at least one stacking device constantly at the maximum speed, since only standard packages are produced by utilizing the full package size.

With the help of the stacking device a whole number $x/n$ of standard packages is produced automatically in this case, x being the total number of product units for the route, and n being the number of product units in the standard package. The remainder r required in order to achieve the complete number x for the route is addressed and discharged in the discharge station. This ensures that only standard packages with a correct sequence of product units are produced in the stacking devices by utilizing the full capacity, whereas the remaining product units likewise arise in the correct sequence in the discharge station in a residual package.

More than one stacking device can be used if this is required by the capacity of the postpress processing installation. The production of the standard packages and, where appropriate, the part packages then takes place in a familiar manner by utilizing the capacity of both stacking devices. The correct sequence of the product units in a single stack is assured by addressing immediately before forming the stack. The division of the addresses for particular packages, and thus the sequence sections, which are produced in a particular stacking device, can be undertaken in different ways. Depending on the positioning of the stacking device and depending on the possibilities for the onward transport of the finished standard packages, the standard packages can be obtained from the stacking devices in an alternating succession in order to be compiled in the correct sequence for onward transport. The same also applies to the one or more part packages. It is also possible for a first section of a route to be packaged completely with a first stacking device, however, and for a second, third, etc., section of the route to be processed with a second, third, etc., stacking device. Whereas, in the former case, the standard packages are compiled alternately into the correct package sequence, in the latter case the plurality of packages, which respectively constitute a section of the route and, for example, are present together on one or more pallets, still require to be brought into the correct sequence for dispatch in sections, for example in pallets.

On the basis of the previously determined route production plan and the maximum package size, that is to say the maximum number of product units and/or collections in a standard pack, a package sequence for the one or more stacking devices is calculated from the standard packages and the size of the part package. The production plan comprises the information in respect of the nature and number of product units in each package, their addressing and the sequence of the packages for dispatch, for loading or for intermediate storage. In the event of defects arising in the production of the final printed products, which occur at the end of a route sequence, all correctly produced final printed products are initially processed into standard packages and part packages via the stacking devices and, where appropriate, via the discharge device. The final printed products for the next route are then processed immediately afterwards by the stacking devices. The subsequently supplied final printed products that have been rectified or produced in additional quantities are no longer processed via the stacking devices, since these do not "wait", but are addressed and discharged via the discharge devices.

A postpress processing installation according to the present invention for producing and processing product units, in particular printed product collections consisting of completed final printed products such as periodicals and newspapers, which are preferably compiled from a jacket product and a plurality of part products and/or inserts in a manner adapted to the route along which they travel, comprises a device for the production of the product units in a manner adapted to the route along which they travel according to a predetermined production plan and a transport device for transporting the product units to at least one stacking device and/or to a discharge station. The jacket products are preferably main products, folded sheets or envelopes. A personalization unit is arranged in each case in the direction of transport immediately before or inside the at least one stacking device and the discharge station.

The personalization unit preferably includes an addressing unit, this in turn preferably being a printer, for example an inkjet printer, or a labelling unit.

According to preferred embodiments, the device for the production of the product units in a manner adapted to the route along which they travel comprises a collecting zone having a first conveyor device, preferably being a belt conveyor or a conveyor with a return feed function and a rectification function, of the kind that have been produced and sold successfully by the applicant for many years under the designations "Rollstream" and "Flystream", and a plurality of feed devices for preferably part products and/or inserts. Collections of part products and/or inserts are produced in this way.

According to further preferred embodiments, the device for the production of the product units in a manner adapted to the route along which they travel comprises an inserting device, preferably an inserting drum, or a driving device in which the collections of part products and/or inserts are inserted or driven into a jacket product.

The transport device is preferably a gripper conveyor, which transports the jacket products from a feeder to the inserting device, and the product units are transported to the stacking device and/or to the discharge device after the insertion of the collection consisting of part products and/or inserts. The jacket products can also be conveyed to the inserting device in some other way. Other conveyor means from the prior art are familiar to a person skilled in the art, and the jacket products can also be discharged from a feeder directly into an inserting device.

According to a further advantageous embodiment, the standard packages produced in the stacking devices are provided with readable information in respect of their contents and preferably with a package identification for the route. This additional information can be printed on a cover sheet, which is applied to the package in the stacking device, or they can be printed directly on an external surface of the package, preferably an externally situated and thus visible surface of a bottom or top final printed product in the package, or applied or stuck on as a label.

The method according to the invention has proven to be robust in relation to production gaps, which arise as a result of rejected defective final printed products in the delivery stream. Since the correct produced final printed products are not personalized in the correct succession until they enter into the stacking devices, it does not matter if gaps are present between these final printed products. In the package, the gaps are closed and the correct order in the stack is always assured.

According to further embodiments of the method and the installation according to the invention, the discharge device comprises a stacking device.

BRIEF DESCRIPTION OF THE DRAWINGS

The invention is now described below in more detail on the basis of illustrative embodiments in conjunction with the drawing. In the Figures.

DESCRIPTION OF PREFERRED EMBODIMENTS

Figure 1:
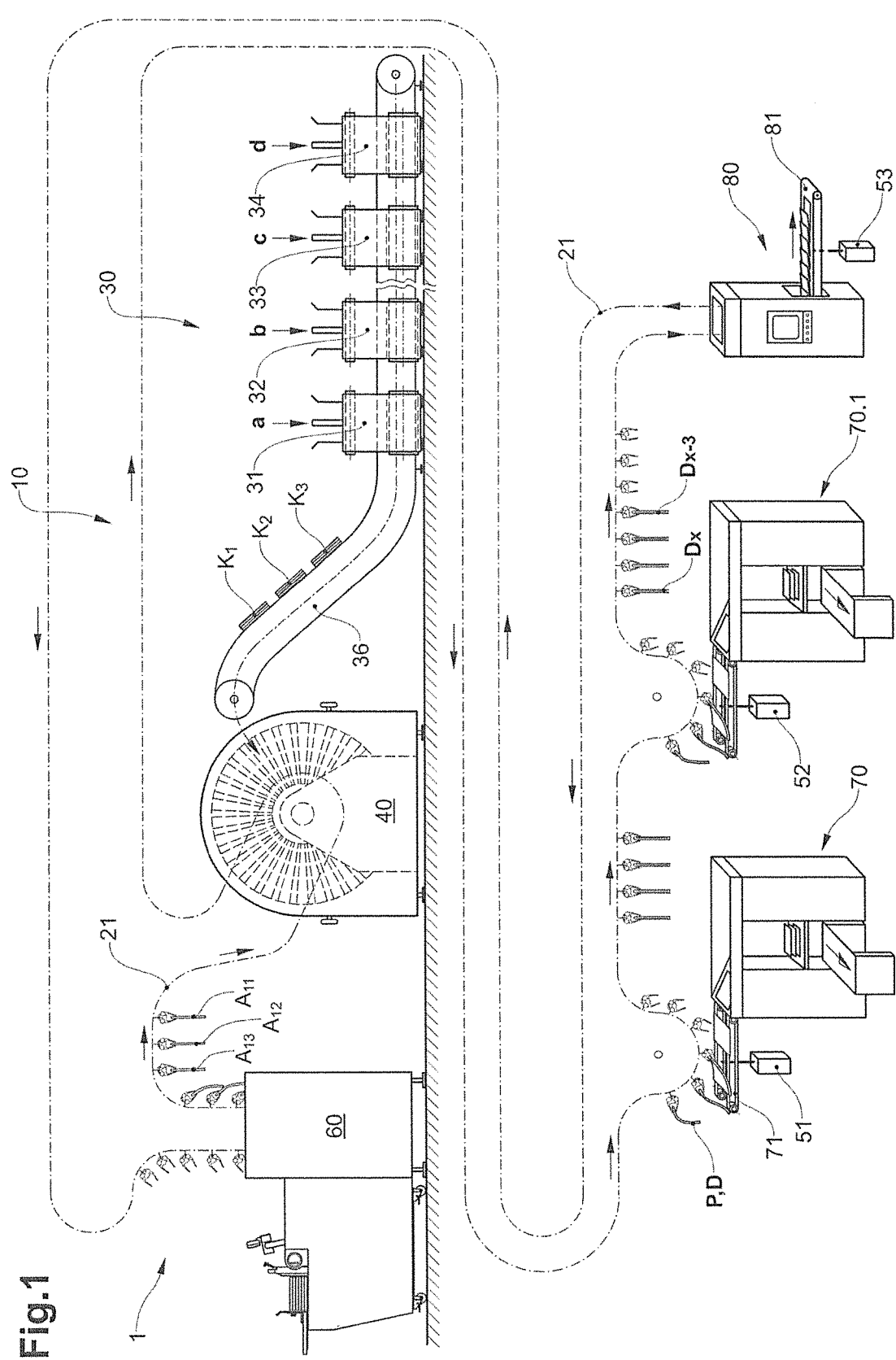
FIG. 1 depicts in a schematic side view a first illustrative embodiment of a postpress processing installation according to the invention having a collecting zone with four feed devices and a belt conveyor, an inserting drum and a feeder for jacket products, two stacking devices and a discharge device.

Depicted in a side view in FIG. 1 is a first illustrative embodiment of a postpress processing installation 1 according to the invention. In a device 10 for the production of product units P in a manner adapted to the route along which they travel in the form of completed final printed products D such as periodicals and newspapers, which are compiled from a jacket product A and a plurality of part products and/or inserts a, b, d, the final printed products D according to a predetermined production plan are produced in a manner adapted to the route along which they travel.

Arranged along a collecting zone 30 are four feed devices 31, 32, 33, 34, each of which is able to discharge part products and/or inserts of types a, b, c and d respectively onto the belt conveyor 36 of the collecting zone. In the illustrated example, collections K consisting of part products and/or inserts of types a, b and d are produced in the collecting zone. The complete collections K are conveyed by the belt conveyor 36 to an inserting drum 40, where they are inserted into in jacket products A.

In the illustrated example, the jacket products A arrive from a feeder 60 and are transported separately to the inserting drum 40 by means of a gripper conveyor 21. It is shown schematically here that three jacket products A are conveyed to the inserting drum with the sequence positions 11, 12 and 13. Already present in the inserting drum 40 is the (not illustrated) first jacket product in the product sequence, into which the collection $K_1$ consisting of the part products $a_1$, $b_1$ and $d_1$, already completed and being conveyed on the belt conveyor 36, is inserted and is completed to produce the final printed product.

This finished final printed product is the first product unit, which is produced for this route with the following composition: jacket product A with inserted part products and/or inserts a, b and d. Depending on the length of the route, a number x of identical route-specific final printed products D are produced with the construction A (a, b, d), x being the number of final printed products required for the route.

The completed final printed products D1 to $D_x$ are transported away from the inserting drum 40 with the same gripper conveyor 21 which delivered the jacket products A, and are conveyed to the package production area.

In the depicted illustrative embodiment, two stacking devices 70, 70.1 are arranged one after the other along the conveyor section. The final printed products D can be discharged from the gripper conveyor 21 onto an infeed conveyor 71 of the stacking device 70 by opening the respective gripper. During or after being deposited onto the infeed conveyor 71, the externally situated jacket product of the final printed product is printed with an address on the lower lateral surface and is personalized as a result. Since the addressing only takes place after production of the complete final printed products, this ensures that all the addressed final printed products, which adopt their fixed place in the route sequence with the addressing, are correctly compiled.

Printing of the address takes place in the illustrated example with a printer 51 arranged under the infeed conveyor 71, which is preferably configured as an inkjet printer and prints the predetermined address onto a corresponding address field through the open spaces that are present between the individual conveyor belts of the infeed conveyor 71.

The final printed product is personalized after printing the address, and its position within the route sequence is determined in this way. All that is now required is for it to be conveyed for the short distance into the stack shaft of the stacking device and discharged into the stack shaft. The likelihood in this case of a defect arising, which in turn would disrupt the sequence in the stack, is extremely low. Printing of the address at this late stage thus ensures that the packages can be produced by utilizing the full capacity of the stacking devices 70, 70.1, while respecting the route sequence. A delay for repairs or waiting for the delivery of repaired or reworked final printed products is not necessary.

If two stacking devices 70, 70.1 are available, as represented in FIG. 1, the delivered product stream can be distributed to both stacking devices 70, 70.1. It is possible to select freely whether the stacking devices 70, 70.1 produced in both standard packages in this case follow one after the other in the route sequence, or whether a subsequence of the route sequence to be produced can be formed independently in each of the stacking devices 70, 70.1.

The discharge of final printed products, the addressing thereof and the formation of standard packages takes place in the stacking devices 70.1, in precisely the same way as described for the stacking devices 70.

The four final printed products $D_{x-3}$ to $D_x$ belong to a previously processed other route and are required to be reworked as a result of a defect in the combination of the inserts. They are conveyed past both of the stacking devices 70, 70.1 and are present on the way to the discharge station 80. In the latter, they are discharged onto a delivery conveyor 81 and can be provided once again with an address by means of a printer 53 and personalized. An end package for the previous route is formed from the four final printed products $D_{x-3}$ to $D_x$. This takes place by hand in the depicted illustrative embodiment. The end package is likewise placed by hand in the right position in the sequence of standard packages of the previously produced packages for this route. The package sequence for this route can be completed in the process, and at the same time the stacking devices are already able to produce the packages for the next route at full speed. Of all the packages on the route, which comprises the reworked final printed products $D_{x-3}$ to $D_x$, only the one end package requires to be added by hand in the correct position to the packages that have been produced automatically in the stacking devices.

Since the only final printed products to be addressed are those that have been compiled completely and correctly, the risk of a further defect arising after addressing and the product sequence also having to be rectified manually or mechanically is reduced significantly.

The number of required product units is known at the time of drawing up the production plan. In the present example, these are final printed products D in the form of jacket products A with inserted collections of part products and/or inserts a, b and d (briefly [A(a, b, d)]). The required number of final printed products x is divided up according to the production plan into a whole number of standard packages and, if necessary, into a part package, which are produced with the help of the two stacking devices 70, 70.1 produced. If, for example, 807 final printed products D of type [A(a, b, d)] are required for the route, and if the thickness of the final printed products D of type [A(a, b, d)] permits a maximum of 20 products per standard package, the production of 40 standard packages, each with 20 final printed products, and one part package with the last 7 final printed products in the stacking devices 70, 70.1 will be planned. However, if a defect arises in the course of the production of the final printed products, and if the final printed products must be rectified or produced in additional quantities, this makes no difference provided that this can still take place within the ongoing production of the number of 807 final printed products for the route, such a case being represented in FIG. 2b and being explained in more detail below.

Figure 2A:
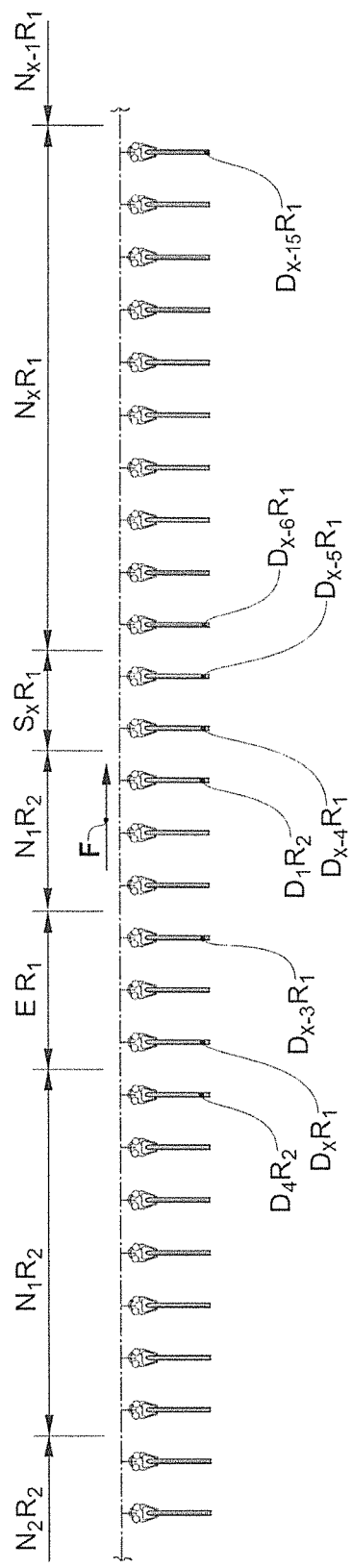
FIG. 2a depicts a schematic side view of a gripper conveyor having two different types of final printed products for two different routes according to a predetermined production plan on the way to the stacking devices, or to the discharge station.

However, if the defect occurs only towards the end of the production of the product sequence, a start can already be made on the production of the final printed products for the next route in order to avoid waiting times. The rectified or reworked final printed products, which are transferred from the gripper conveyor, are accordingly present between the final printed products of a different route. This is depicted in FIG. 2a, which shows a schematic side view of a gripper conveyor with two different types of final printed products for two different routes $R_1$ and $R_2$ according to a predetermined production plan on the way to the stacking devices, or to the discharge station.

The affiliation of the final printed products D to the respective standard packages N, to a part package S or to an end package E is represented via the gripper conveyor. A defect has arisen in the course of the production of the depicted sequence of printed products D for the route $R_1$, and three final printed products $D_x R_1$ to up to and including $D_{x-3} R_1$ are required to be reworked and are now conveyed in the gripper conveyor between final printed products of the route $R_2$, that is to say in a false sequence.

In the illustrated example, the size of the standard packages N is 10 products. The 10 final printed products (beginning with $D_{x-15} R_1$ and ending with $D_{x-6} R_1$) for the last standard stack $N_x R_1$ of route $R_1$ are represented in the conveying direction F on the far right. They are followed by two final printed products $D_{x-4} R_1$, $D_{x-5} R_1$, from which a part package is produced in the stacking device. There then follow the first three final printed products for the next route $R_2$, beginning with $D_1 R_2$, which are fed to a stacking device.

The reworked final printed products $D_x R_1$ to $D_{x-3} R_1$ follow within the product sequence for route 2, although this is not a problem, since they are not discharged in the stacking device, and as a consequence they do not also end up in the wrong route, but are conveyed to the discharge station and are addressed there and are compiled to produce an end package for their route R1.

The subsequent additional seven final printed products for the route $R_2$ are discharged at the same stacking device as the final printed products $D_1 R_2$ to $D_3 R_2$, on the other hand, and, together with the latter, form the first standard package for the second route $N_1 R_2$.

Figure 3A:
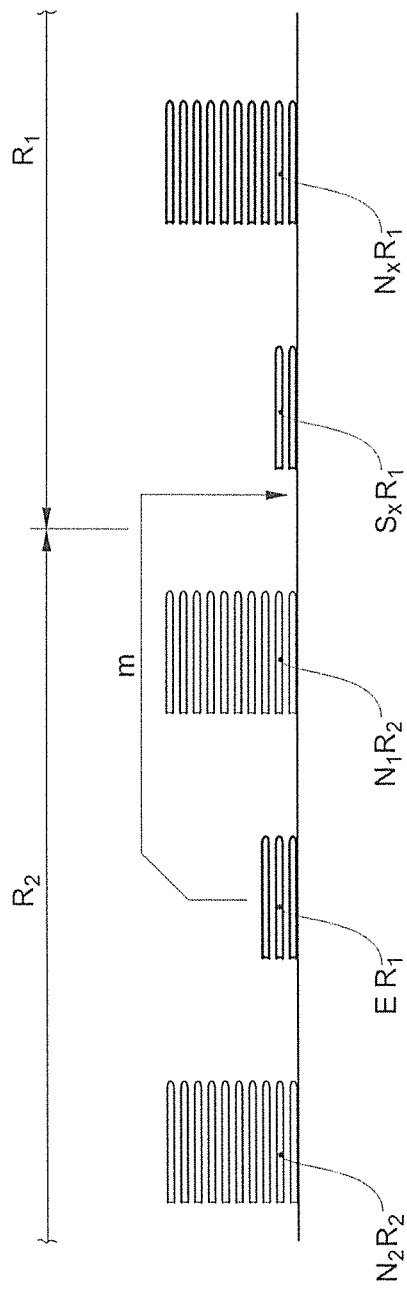
FIG. 3a depicts a schematic representation of the product packages, which have been produced from the supplied final printed products in FIG. 2a for the two different routes, the arrow m symbolizing the manual addition of an end package to its route.

The packages produced according to this example for the first and the second route are illustrated in FIG. 3a. The package sequence for route $R_1$ ends with the part package $S_x R_1$, which follows the last standard package $N_x R_1$. The end package $ER_1$ subsequently produced in the discharge station is, as indicated in the Figure by means of the arrow m, placed by hand in the right package-sequence position within the route $R_1$. This also ensures that the sequence of the first two standard packages $N_1 R_2$ and $N_2 R_2$ of the second route is correct.

In the event that defects in the course of the production of the final printed products lead not only to defects in the sequence of the final printed products, but also to gaps, according to the present invention such sequences can also be processed without problem into packages in the correct sequence.

Figure 2B:
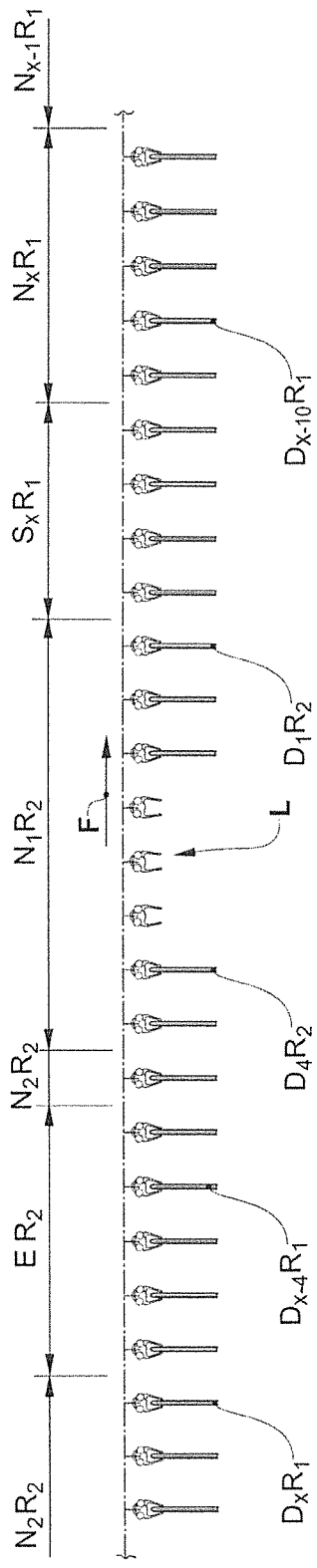
FIG. 2b depicts a schematic side view of a gripper conveyor having two different types of final printed products for two different routes according to a further predetermined production plan on the way to the stacking devices, or to the discharge station, a gap being present between the final printed products for the second route.
Figure 3B:
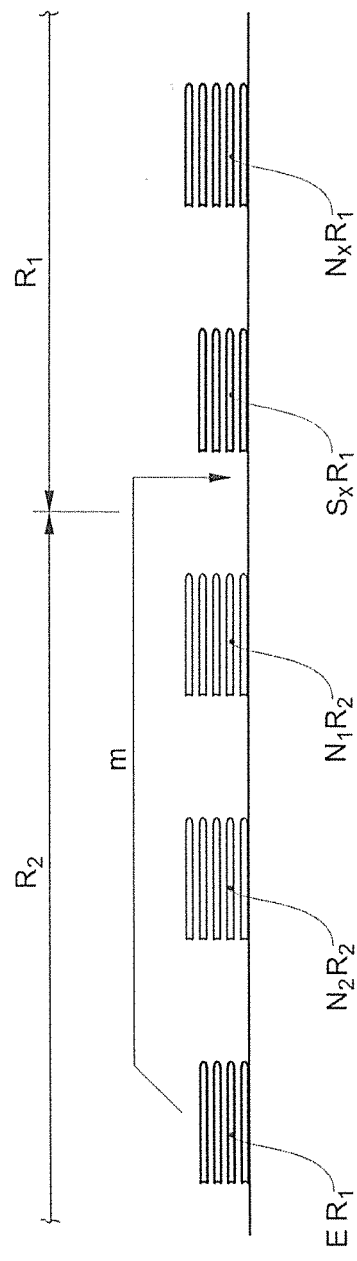
FIG. 3b depicts the schematic representation of the product packages, according to the example in FIG. 2b, the arrow m again representing the manual addition of the end package to the correct route.

A corresponding example is depicted in FIGS. 2b and 3b, in which standard packages consisting of five final printed products are to be produced. An overview of the two figures reveals that the sequence of the final printed products D that is beset with defects and gaps in the gripper conveyor can be processed with a minimum amount of manual effort in a manner adapted to the route along which they travel into the correct sequence of packages in the correct order inside the packages.

The subsequently produced last products $D_x R_1$ to $D_{x-4} R_1$ are again not discharged onto the stacking devices, but are processed by means of the discharge station into the end package $ER_1$ depicted in FIG. 3b, which is added manually to the package sequence for the first route $R_1$. The gap L between the third and the fourth final printed product $D_4 R_2$ of the second route is closed automatically in the stacking device, and a correct first standard package $N_1 R_2$ is formed for the second route $R_2$, as depicted in FIG. 3b.

In the event of defects arising in the course of the production of the final printed products or the collection of part products and/or inserts, these defective products are separated at stations that are not illustrated in the figures and can be separated manually, as appropriate, into main products and part products and/or inserts and fed back to the feed devices 31, 32, 33, 34 and/or the feeder 60.

In order to ensure that an adequate number of correctly produced final printed products is available for the route to be produced, use may be made of inspection devices that are familiar to the applicant. This correct number is either checked during production, or a corresponding number of additional final printed products for the route will be commissioned with full knowledge of the customary production defects for the installation. If the defect rate in the course of production of the final printed products for the route lies within the customary percentage, this will ensure that a sufficient quantity of final printed products can be addressed and packaged. If, following production of all the required standard packages and the end package, any final printed products that have been produced in a manner adapted to the route along which they travel are left over, but are no longer required, these can easily be ejected via the discharge station 80, separated into their component parts and, since they are not personalized, returned into the feed devices and/or the feeder.

I claim:

1. A method for operating a postpress processing installation (1) for producing and processing product units which are compiled from a jacket product (A) and a plurality of part products and/or inserts (a, b, c, d), the method comprising:

producing the product units according to a predetermined production plan in a manner adapted to a route along which the product units travel and are processed by means of at least one stacking device (70, 70.1) to form a sequence of packages (N, S), the product units being personalized and/or addressed only immediately before or only inside the at least one stacking device (70, 70.1), and in that all the product units that have not been processed in the at least one stacking device (70, 70.1) are personalized and are made available for packaging by a discharge station (80), which is available for personalization and/or addressing, wherein, in the event of defects arising in the course of the production of the product units (P) for the route (R), with the result that product units (P) that have been rectified and/or produced in additional quantities in the production sequence lie outside the route (R), said product units that have been rectified or produced in additional quantities are not processed in the at least one stacking device, but are transported to the discharge station (80) and gathered together into an end package (E), which is then added to other packages (N, S) on the route, which other packages (N, S) are processed by means of at least one stacking device (70, 70.1) so as to form a sequence of packages.

2. The method according to claim 1, wherein the packages (N, S) are produced on a single stacking device (70, 70.1) or distributed on more than one stacking device (70, 70.1), the packages (N, S), when more than one stacking device (70, 70.1) is used, being compiled alternately or by sections of the route into the correct package sequence consisting of the standard packages (N).

3. The method according to claim 1, wherein the packages (N, S) produced in the at least one stacking device (70, 70.1) are provided with readable information in respect of their content and/or with a package identification, said information being printed on a cover sheet or directly onto an external surface of an externally situated final printed product in the package (N).

4. A method for operating a postpress processing installation (1) for producing and processing product units which are compiled from a jacket product (A) and a plurality of part products and/or inserts (a, b, c, d), the method comprising:

producing the product units according to a predetermined production plan wherein a required number of final products is divided up according to the production plan into a whole number of standard packages and into a part package of further required product units and in a manner adapted to a route along which the product units travel and are processed by means of at least one stacking device (70, 70.1) to form a sequence of packages (N, S), the product units being personalized and/or addressed, only immediately before or only inside the at least one stacking device (70, 70.1), and in that all the product units that have not been processed in the at least one stacking device (70, 70.1) are personalized and are made available for packaging by a discharge station (80), which is available for personalization and/or addressing producing a whole number x/n of standard packages (N) from the product units (P) for the product sequence of the route, without the product units that have been rectified or produced in additional quantities, with the at least one stacking device (70, 70.1), x being the total number of product units for a route minus the product units that have been rectified or produced in additional quantities, and n being the number of product units in the standard package, detecting or identifying a remainder or number of further required production units, respectively, for according to the production plan, and processing or producing the part package with the detected or identified number of further required product units of the remainder, wherein the part package comprises a smaller number of product units than the standard packages.

5. The method according to claim 4, wherein, in the event of defects arising in the course of the production of the product units (P) for the route (R), with the result that product units (P) that have been rectified and/or produced in additional quantities in the production sequence lie outside the route (R), said product units that have been rectified or produced in additional quantities being discharged via a discharge station (80) and being gathered together into an end package (E), which is then added to the other packages (N, S) on the route, which are then processed by means of at least one stacking device (70, 70.1) so as to form a sequence of packages.

6. A postpress processing installation (1) for the production and processing of product units (P) which are compiled from a jacket product (A) and a plurality of part products and/or inserts (a, b, c, d) in a manner adapted to a route along which the product units travel, comprising:

a device for the production of the product units (10) according to a predetermined production plan wherein a required number of final products is divided up according to the production plan into a whole number of standard packages and into a part package of further required product units and in a manner adapted to the route along which the product units travel, the device including at least one stacking device (70, 70.1), a discharge station (80) configured to gather together product units that have been rectified or produced in additional quantities into an end package, and a transport device for transporting the product units (P) to the at least one stacking device (70, 70.1) or to the discharge station (80), a first personalization unit being arranged in the direction of transport immediately before or inside the at least one stacking device (70, 70.1) and a second personalization unit being arranged in the direction of transport immediately before or inside the discharge station (80), wherein the part package comprises a smaller number of product units than the standard packages.

7. The postpress processing installation (1) according to claim 6, wherein the personalization unit is an addressing unit in the form of a printer (51, 52, 53) or a labelling unit.

8. The postpress processing installation (1) according to claim 7, wherein the device for production of the product units (10) in a manner adapted to the route along which the product units travel comprises a collecting zone (30) having a first conveyor device and a plurality of feed devices (31, 32, 33, 34) for preferably part products and/or inserts (a, b, c, d) for producing collections (K) of part products and/or inserts (a, b, c, d).

9. The postpress processing installation (1) according to claim 8, wherein the device for production of the product units (10) in a manner adapted to the route along which the product units travel comprises an inserting device, an inserting drum (40), or a driving device, in which the collections (K) of part products and/or inserts (a, b, c, d) are inserted or driven into a jacket product (A).

10. The postpress processing installation (1) according to claim 9, wherein the transport device comprises a gripper conveyor (21), which transports the jacket products from a feed device or a feeder (60), to the inserting device (40) and, after insertion of the collection (K) of part products and/or inserts (a, b, c, d), transports the product units (P) to the stacking device (70, 70.1) and/or to the discharge station (80).

11. The postpress processing installation (1) according to claim 6, wherein the stacking devices (70, 70.1) are provided with a device for the addition of a package identification, said device comprising a feeder for a cover sheet printed with the package identification information and/or a cover sheet printer or a printer, which prints the package identification information directly onto an external surface of an externally situated final printed product in the package (N).

* * * * *